(12) United States Patent
Li et al.

(10) Patent No.: US 9,071,842 B2
(45) Date of Patent: Jun. 30, 2015

(54) DETECTION OF VIDEO FEATURE BASED ON VARIANCE METRIC

(75) Inventors: Ying Li, Richmond Hill (CA); Xu Gang Zhao, Maple (CA)

(73) Assignee: VIXS Systems Inc., Toronto (CA)

( * ) Notice: Subject to any disclaimer, the term of this patent is extended or adjusted under 35 U.S.C. 154(b) by 393 days.

(21) Appl. No.: 13/450,870

(22) Filed: Apr. 19, 2012

(65) Prior Publication Data

US 2013/0279563 A1    Oct. 24, 2013

(51) Int. Cl.
| | |
|---|---|
| H04N 7/12 | (2006.01) |
| H04N 19/40 | (2014.01) |
| H04N 19/115 | (2014.01) |
| H04N 19/114 | (2014.01) |
| H04N 19/132 | (2014.01) |
| H04N 19/14 | (2014.01) |
| H04N 19/142 | (2014.01) |
| H04N 19/17 | (2014.01) |

(52) U.S. Cl.
CPC ............ *H04N 19/40* (2014.11); *H04N 19/115* (2014.11); *H04N 19/114* (2014.11); *H04N 19/132* (2014.11); *H04N 19/14* (2014.11); *H04N 19/142* (2014.11); *H04N 19/17* (2014.11)

(58) Field of Classification Search
USPC .................................................. 375/240.02
See application file for complete search history.

(56) References Cited

U.S. PATENT DOCUMENTS

| | | | |
|---|---|---|---|
| 5,486,863 A | | 1/1996 | Auyeung et al. |
| 5,610,659 A | | 3/1997 | Maturi et al. |
| 5,768,431 A | | 6/1998 | Saunders et al. |
| 5,883,672 A | * | 3/1999 | Suzuki et al. ............ 375/240.04 |
| 5,978,029 A | | 11/1999 | Boice et al. |
| 6,094,457 A | * | 7/2000 | Linzer et al. ............. 375/240.12 |
| 6,223,193 B1 | | 4/2001 | Pau et al. |
| 8,369,633 B2 | * | 2/2013 | Lu et al. ........................ 382/236 |
| 2004/0255176 A1 | | 12/2004 | George et al. |
| 2007/0074266 A1 | | 3/2007 | Raveendran et al. |
| 2009/0237569 A1 | * | 9/2009 | Saito et al. .................... 348/700 |
| 2009/0316997 A1 | * | 12/2009 | Samuelsson et al. ......... 382/199 |
| 2010/0111161 A1 | | 5/2010 | Ramachandran |
| 2010/0111162 A1 | | 5/2010 | Ramachandran |
| 2010/0202262 A1 | * | 8/2010 | Adams et al. ............... 369/47.15 |
| 2011/0119709 A1 | * | 5/2011 | Kim et al. ....................... 725/39 |
| 2012/0027079 A1 | * | 2/2012 | Ye et al. ................... 375/240.02 |

FOREIGN PATENT DOCUMENTS

WO       02071639 A1    9/2002

* cited by examiner

*Primary Examiner* — Tracy Li

(57) ABSTRACT

A metric representing the sum of variances for pixel blocks of a region of an image are used to identify the presence a video feature of the image, and a transcoding is performed responsive to identifying the presence of the video feature. The identified video feature can include, but is not limited to, a scene change, the presence of a black border region or a caption region, or the complexity of the image. The transcoding operation can include, but is not limited to, coding the image as an Intra-frame, omitting the content corresponding to the black border region or the caption region from the transcoded image or allocating a relatively lower bit budget for the black border region or a relatively higher bit budget to the caption region during transcoding of the image, or setting the bit budget for rate control during transcoding.

4 Claims, 5 Drawing Sheets

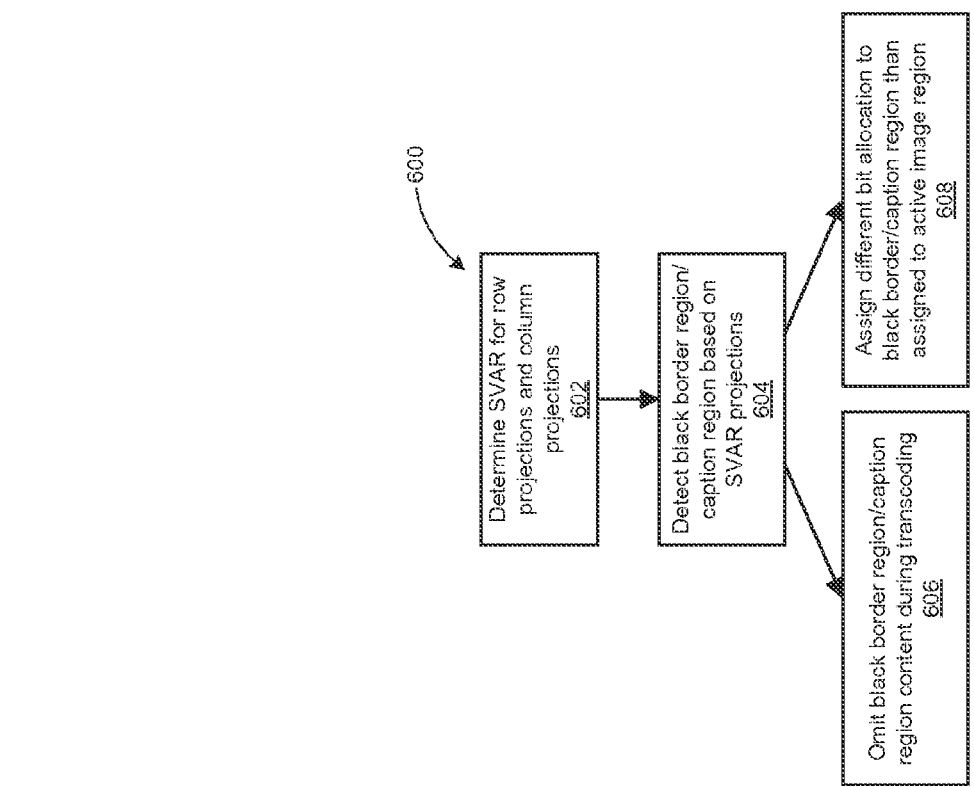
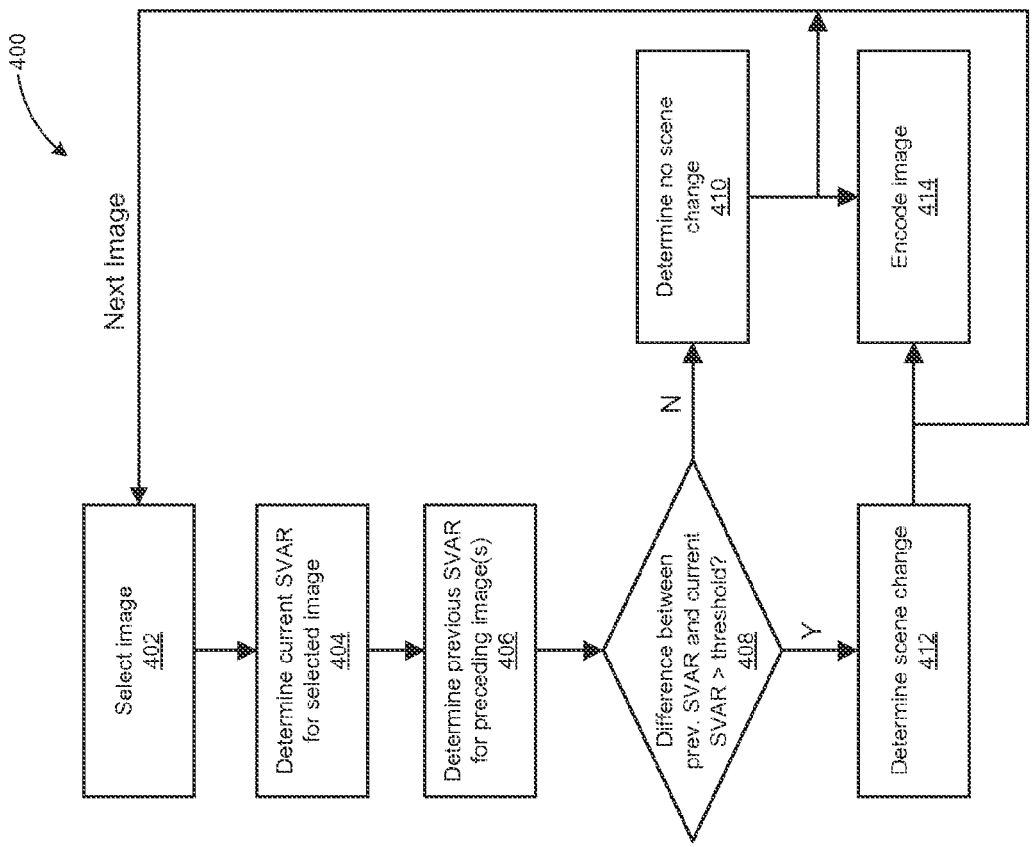

DETECTION OF VIDEO FEATURE BASED ON VARIANCE METRIC

FIELD OF THE DISCLOSURE

The present disclosure relates generally to video processing, and more particularly to video encoding and transcoding.

BACKGROUND

Video encoding or transcoding frequently is used to reduce the amount of video data to be stored or transmitted or to convert a video signal from one format to another. Effective transcoding often relies on the accurate detection of features present in the video content, such as blank screens, scene changes, black borders, and the like. Conventional techniques for identifying these features, such as by detecting a change in sound level for identifying a scene change or by determining the number of pixels having a certain color for identifying a black border, often are inefficient or ineffective at identifying the corresponding feature.

BRIEF DESCRIPTION OF THE DRAWINGS

The present disclosure may be better understood, and its numerous features and advantages made apparent to those skilled in the art by referencing the accompanying drawings.

FIG. 4 is a flow diagram illustrating a method for detecting a scene change based on a sum of variances analysis in accordance with at least one embodiment of the present disclosure.

FIG. 6 is a flow diagram illustrating a method for detecting a black border region or caption region in an image based on a sum of variances analysis in accordance with at least one embodiment of the present disclosure.

DETAILED DESCRIPTION

FIGS. 1-8 illustrate techniques for encoding or transcoding a video signal based on video features detected using an analysis of one or more sum of variances metrics for images represented by the video signal. During a typical transcoding process, the variance (often referred to as "VAR") of the pixels within a macroblock or other block of pixels is calculated and used for motion detection or motion estimation. The variance of a pixel block represents the relative similarity or dissimilarity of the pixels within the pixel block. However, this variance, when considered across a region of pixel blocks, also can be used to identify certain video features for which the variance is expected to be relatively low for the region (e.g., within a black border region due to the constant black pixels) or relatively high for the region (e.g., within a caption region due to the high contrast between the white pixels of the caption text and the black pixels of the background). Moreover, a significant difference between the variances for a region of one image and the variances for the same region of the next image can be indicative of a scene change between the images. Accordingly, in at least one embodiment the variances of pixel blocks for a specified region are summed and a metric representing this sum of variances (SVAR) is be used to determine whether certain types of video features are present in the image. The one or more encoding or transcoding operations then may be performed in response to the identification of the video feature in the image. As one example, the sum of variances of a number or all of the pixel blocks of an image may be used as a metric of the complexity of the image, and this complexity feature of the image may be used for bit allocation for a rate control process. As another example, the sum of variances metric for an image may be compared with a metric representing the sum of variances for one or more preceding images to determine whether the image represents a scene change. In response to detecting the image represents a scene change, the transcoding process can implement the transcoded version of the image as an Intra-coded frame (I-frame) in a new group of pictures (GOP). As yet another example, the sum of variance metrics for one or more columns of pixel blocks or rows of pixel blocks may be used to detect the presence of a black border region or a caption region and the transcoding process adapted accordingly, such as by omitting the black border region/caption region from the corresponding image in the transcoded signal, by determining a true resolution of the active image region surrounded by the black border region or adjacent to the caption region (which can prove useful in setting the threshold for scene change detection), by detecting a scene change based on a presence or change in the black border region, or by assigning a different bit budget to the black border region/caption region while transcoding the image.

Figure 1:
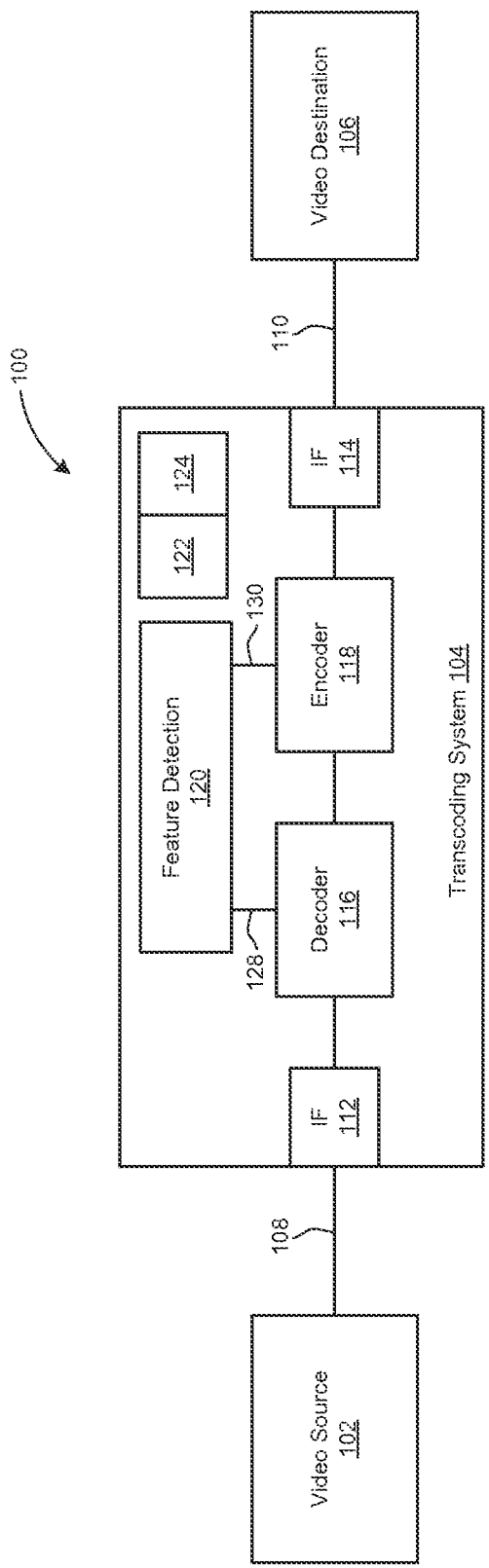
FIG. 1 is a block diagram illustrating a video processing system having video feature detection based on sum of variances metrics in accordance with at least one embodiment of the present disclosure.

FIG. 1 illustrates, in block diagram form, a video processing system 100 in accordance with at least one embodiment of the present disclosure. The video processing system 100 includes a video source 102, a transcoding system 104, and a video destination 106. The video source 102 transmits or otherwise provides one or more video signals in analog or digital form. For example, the video source 102 can comprise a receiver for a satellite or cable transmission system, a storage element (e.g., a hard drive), a server streaming video content over the Internet or other network, a digital versatile disc (DVD) or Blu-Ray™ disc, and the like. The video destination 106 can comprise any of a variety of intermediate or final destinations of a transcoded video signal, such as a storage element, a networked computer, set-top box, or television, and the like. The transcoding system 104 transcodes a video signal 108 received from the video source 102 to generate a transcoded video signal 110 for output to the video destination 106. For example, the transcoding system 104 may be implemented as a system-on-a-chip (SOC) or other component of a set-top box, personal video recorder (PVR), media gateway, or network attached storage (NAS). The video signal 108 and the transcoded video signal 110 each can be encoded in accordance with a digital video format such as H.264, MPEG-4 Part 10 Advanced Video Coding (AVC) or other digital format such as a Moving Picture Experts Group (MPEG) format (such as MPEG1, MPEG-2 or MPEG4), Quicktime format, Real Media format, Windows Media Video (WMV) or Audio Video Interleave (AVI), or another digital video format, either standard or proprietary.

The video processing system 100 can represent any of a variety of video systems in which encoding or transcoding can be advantageously used. For example, in one embodiment, the video processing system 100 comprises a satellite or cable television system whereby video content is streamed from a broadcaster to a set-top box at a customer's premises. In this example, the video destination 106 can include, for example, a non-volatile memory at the set-top box and the transcoding system 104 can include a SOC at the set-top box for use in transcoding the video content and providing the transcoded video content to the non-volatile memory. As another example, the video processing system 100 can comprise a video content server system, whereby the video source 102 comprises a hard drive storing original video content, the video destination 106 is a remote computer system connected to the video content server via a network, and the transcoding system 104 is used to transcode the video content responsive to current network conditions before the transcoded video content is transmitted to the remote computer system via the network.

In the illustrated embodiment, the transcoding system 104 includes interfaces 112 and 114, decoder 116, encoder 118, and a feature detection module 120. The interfaces 112 and 114 include interfaces used to communicate signaling with the video source 102 and the video destination 106, respectively. Examples of the interfaces 112 and 114 include input/output (I/O) interfaces, such as Peripheral Component Interconnect Express (PCIE), Universal Serial Bus (USB), Serial Attached Technology Attachment (SATA), wired network interfaces such as Ethernet, or wireless network interfaces, such as IEEE 802.11x or Bluetooth™ or a wireless cellular interface, such as a 3GPP, 4G, or LTE cellular data standard. The decoder 116, encoder 118, and feature detection module 120 each may be implemented entirely in hardware, entirely as software stored in a memory 122 and executed by a processor 124, or a combination of hardware logic and software-executed functionality. To illustrate, in one embodiment, the transcoding system 104 is implemented as a SOC whereby portions of the decoder 118, the encoder 118, and the feature detection module 120 are implemented as hardware logic, and other portions are implemented via firmware stored at the SOC and executed by a processor of the SOC. The hardware of the transcoding system 104 can be implemented using a single processing device or a plurality of processing devices. Such processing devices can include a central processing unit (CPU), a graphics processing unit (GPU), a microcontroller, a digital signal processor, a field programmable gate array, programmable logic device, state machine, logic circuitry, analog circuitry, digital circuitry, or any device that manipulates signals (analog and/or digital) based on operational instructions that are stored in a memory, such as memory 122. Memory 122 may be a single memory device or a plurality of memory devices. Such memory devices can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The decoder 116 operates to receive the video signal 108 via the interface 112 and partially or fully decode the video signal 108 to create a decoded data stream 126, which can include pixel information, motion estimation/detection information, timing information, and other video parameters. The transcoder 118 receives the decoded data stream 126 and uses the video parameters represented by the decoded data stream to generate the transcoded video signal 110, which comprises a transcoded representation of the video content of the original video signal 108. The transcoding process implemented by the encoder 118 can include, for example, a stream format change (e.g., conversion from an MPEG-2 format to an AVC format), a resolution change, a frame rate change, a bit rate change, and the like.

The feature detection module 120 receives pixel information 128 from the decoder 116 as it decodes the video signal 108 and modifies or otherwise controls via control signaling 130 various encoding operations of the encoder 118 based on a variance analysis of this pixel information. For example, during the motion estimation/detection process, the variances of some or all of the pixel blocks of an image being analyzed are provided as part of the pixel information 128, and the feature detection module 120 uses a sum of variances for pixel blocks within one or more regions of the image to detect the presence of one or more video features. To illustrate, the sum of variances for the pixel blocks of the entire image (or a substantial portion thereof) can be used by the feature detection module 120 to detect a scene change, and in response, instruct the encoder 118 to start a new group-of-pictures (GOP) and encoded the image as an intra-frame (I-frame). As another example, the feature detection module 120 can use the sum of variances for the pixel blocks of one or more regions of the image to detect a black border region at the periphery of an active image region or a region of the image used to display caption information, and in response can control the encoder 118 so as to either remove the detected black border/caption region from the resulting encoded image, to allocate a lower bit rate to the detected black border and a higher bit rate to the active image region of the image (that is, the region of the image bordered by the black border region or adjacent to the caption region and which contains non-caption/non-black border image content), to allocate a higher bit rate to the detected caption region so as to reduce the potential for subjective artifacts, or to determine a scene change based on the presence of, or a change in, the black border region. As yet another example, the feature detection module can use the sum of variances for the pixels of one or more regions of an image to determine the complexity of the image, and then adjust the rate control parameters applied by the encoder 118 to the frame based on this determined complexity.

Figure 2:
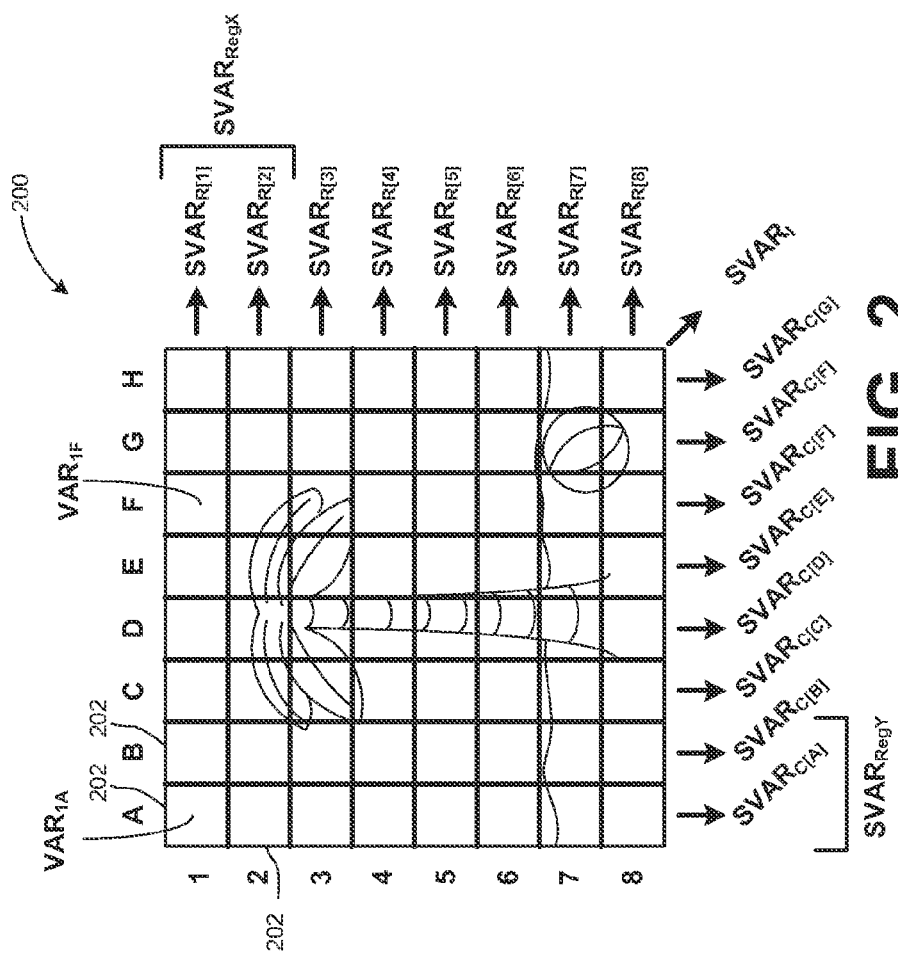
FIG. 2 is a diagram illustrating various approaches for calculating a sum of variances metric for an image of a video signal in accordance with at least one embodiment of the present disclosure.

FIG. 2 provides an example context to illustrate various terms used herein with respect to variance. The illustrated image 200 (I-frame) is comprised of a matrix of pixel blocks 202 arranged in a plurality of rows and columns. The image 200 can be a field of a video frame (e.g., an odd field or an even field in an interlaced implementation) or the complete video frame (e.g., both the odd field and even field combined in a progressive implementation). A typical video image can comprise hundreds, or even thousands, of rows and columns of these pixel blocks 202. However, for ease of illustration, the image 200 is a simplified image comprising sixty-four pixel blocks 202 arranged in eight horizontal rows (labeled 1-8) and eight columns (labeled A-H). Each pixel block 202 in turn comprises a matrix of pixels (not shown) arranged in rows and columns. Each pixel block 202 can comprise one or more macroblocks. To illustrate, in one embodiment each of the pixel blocks 202 is a 16×16 macroblock in accordance with the H.263 or H.264 standards, and thus represents 256 pixels arranged in sixteen rows and sixteen columns. In another embodiment, each of the pixel blocks 202 comprises a matrix of macroblocks, such as a 4×4 matrix of 16×16 macroblocks. In yet another embodiment, each of the pixel blocks 202 comprises only a portion of a macroblock, such as a 4×4 partition of a 16×16 macroblock.

A variance, often denoted as "VAR", can be determined for some or all of the pixel blocks 202 of the image 200, as either part of a motion estimation or motion detection process or as a separate process. This variance typically is determined from the luminance values of the pixels of the pixel block 202, although in other embodiments the color information may be used to determine the variance. Techniques for calculating the variance for a block of pixels is well known in the art, and a discussion of one such technique for variance calculation is described in U.S. Pat. No. 6,223,193. For ease of reference, the variance for a pixel block 202 at row i and column j is denoted as $VAR_{i,j}$. Thus, the variance for the pixel block 202 at row 1 and column A is denoted as $VAR_{1A}$ and the variance for the pixel block 202 at row 1 and column F is denoted as $VAR_{1F}$.

The metrics pertaining to the sum of variances (SVAR) for one or more regions of an image can prove useful in identifying certain characteristics of the image. For example, as described in greater detail herein, the sum of variances for some or all of the pixel blocks 202 of the image 200 can prove useful in determining whether the image 200 represents a scene change or in determining the relative complexity of the image. As another example, the sum of variances for certain regions of pixel blocks 202 can prove useful in identifying black border regions or caption regions in the image 200.

As used herein, the sum of variances metric representing the summation of variances for pixel blocks along a row i of pixel blocks is called a variance row projection and is denoted $SVAR_{R[i]}$. Similarly, the sum of variances metric representing the summation of variances for pixel blocks along a column j of pixel blocks is called a variance column projection and is denoted $SVAR_{C[j]}$. Sum of variances metrics also can be calculated for regions of the image 200 that comprise multiple rows or multiple columns. For example, a sum of variances metric representing a region X composed of rows 1 and 2 can be calculated and denoted as $SVAR_{RegX}$, or a sum of variances metric representation a region Y composed of columns A and B can be calculated and denoted as $SVAR_{RegY}$. Further, sum of variances metric can be calculated for regions of the image 200 that comprise only portions of rows or only portions of columns. To illustrate, a sum of variances metric may be calculated for an expected active image region composed of those pixel blocks 202 that are, for example, both in rows 3-6 and in columns C-F, or a sum of variances metric may be calculated for an expected black border region composed of those pixel blocks 202 that are, for example, both in one of rows 1, 2, 7, or 8 and in one of columns A, B, G, or H. Further, a sum of variances metric may be calculated for all of the pixel blocks 202 of the image and denoted as $SVAR_I$.

Figure 3:
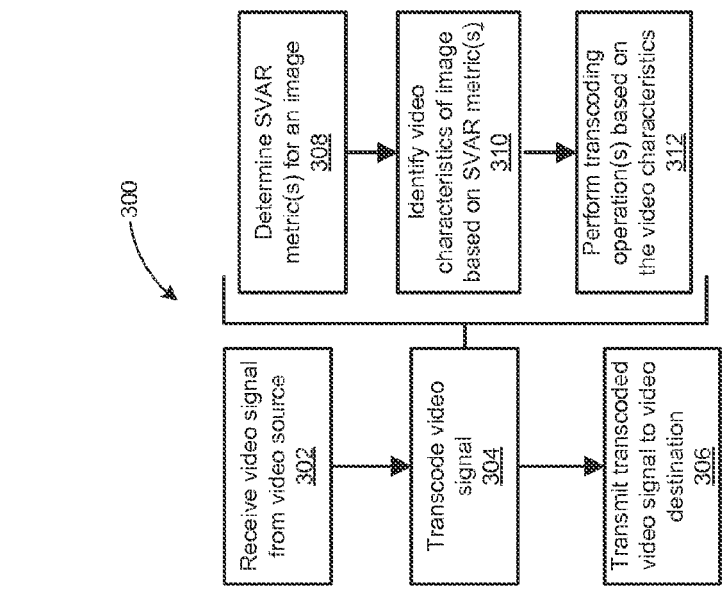
FIG. 3 is a flow diagram illustrating a method for transcoding a video signal based on video features identified through a sum of variances analysis in accordance with at least one embodiment of the present disclosure.

FIG. 3 illustrates an example method 300 of operation of the transcoding system 104 of FIG. 1. At block 302, the transcoding system 104 receives the video signal 108 from the video sources 102, wherein the video signal 108 can be received from a remove source over a wired or wireless network, received from a local storage device via an I/O interface, and the like. At block 304, the transcoding system 104 transcodes the video signal 108 to generate the transcoded video signal 110. This transcoding process can include one or more of an encoding format conversion, a resolution conversion, a bit rate conversion, a frame rate conversion, and the like. At block 306, the transcoding system 104 transmits the transcoded video signal to the video destination 106, wherein the transcoded video signal can be transmitted to a remote destination via a wired or wireless network, transmitted to a local storage device via an I/O interface, and the like.

As part of the transcoding process of block 304, the feature detection module 120 processes certain images represented in the video signal 108 (or the decoded version thereof) so as to identify certain characteristics in the images and modify the transcoding process in response to identifying the characteristics. The images processed by the feature detection module 120 typically include, for example, the I-frames of the video signal 108 (or a subset of the I-frames), although predicted frames (P-frames) and bi-predicted frames (B-frames) also may be analyzed. The processing of an image by the feature detection module 120 includes determining one or more sum of variances metric for an image, or one or more regions of the image, at block 308. For example, the sum of variances metric determined for the image can include the sum of variances for the entire image ($SVAR_I$), the variance row projections for one or more rows ($SVAR_{R[i]}$), the variance column projections for one or more columns ($SVAR_{C[j]}$), or the sum of variances for other regions of the image.

At block 310, the feature detection module 120 uses the one or more SVAR metrics determined at block 308 to detect one or more video characteristics associated with the image. Examples of the video characteristics which may be detected include, but are not limited to, a scene change, a repeat picture, a fade-in or fade-out, the presence and location of a caption regions used to provide closed captioning or subtitles, the presence and location of a black border region and an active image region, the relative complexity of the image, and the like. At block 312, the feature detection module 120 controls the encoder 118 (FIG. 1) via control signaling 130 so as to perform at least one transcoding operation (which can include modifying at least one transcoding operation), based on the detected characteristics of the image. If the detected characteristic is that the image represents a scene change, the transcoding operation performed in response can include, for example, encoding the image as an I-frame at the start of a new GOP, or allocating a higher bit rate to the image during transcoding. If the detected characteristic is the presence of a black border region or caption region, the transcoding operation performed in response can include, for example, encoding the image so as to omit the black border region or caption region from the corresponding encoded image, omitting the black border region or caption region from the analysis of the image for scene change detection, or encoding the image so as to assign a different bit allocation to the black border region/caption region than the bit allocation assigned to the active image region. If the detected characteristic is the complexity of the image, the transcoding operation performed in response can include, for example, setting the rate control or quantization parameter. FIGS. 4-8 illustrate various examples of the processes performed at blocks 308-312.

Figure 5:
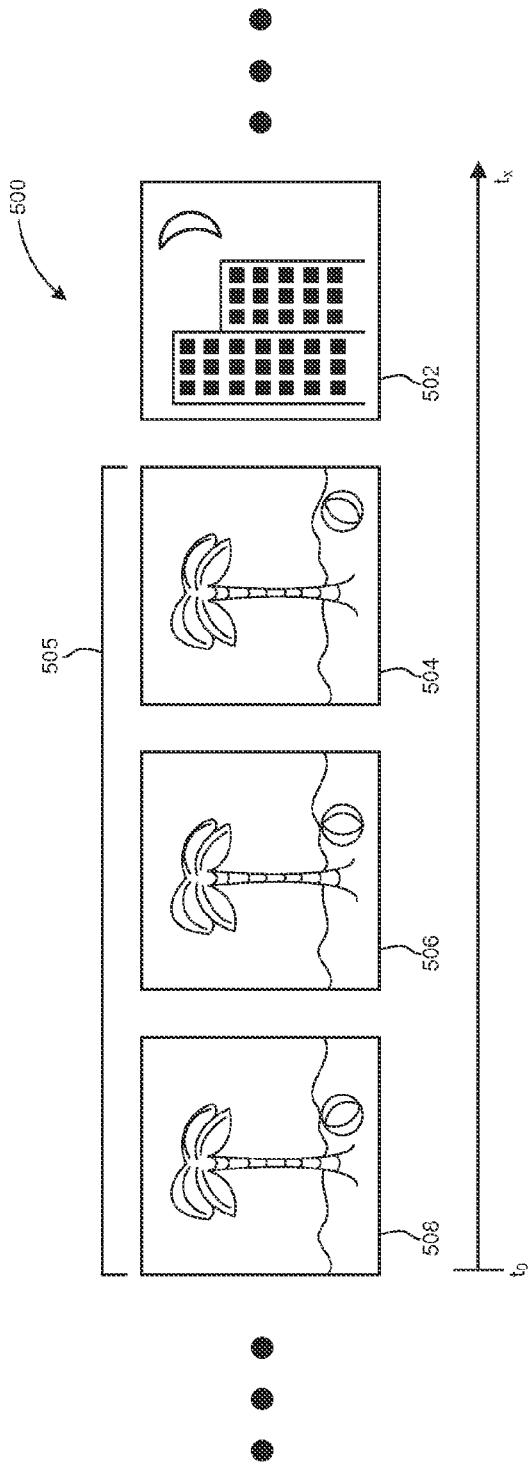
FIG. 5 is a diagram illustrating an example implementation of the method of FIG. 4.

FIGS. 4 and 5 illustrate a method 400 (FIG. 4) for detecting scene changes in a video signal 500 (FIG. 5) based on SVAR metrics in accordance with at least one embodiment of the present disclosure. The method 400 initiates at block 402 whereby the feature detection module 120 receives or selects for scene change analysis an image 502 from the video signal 500 being processed for encoding or transcoding by the transcoding system 104 (FIG. 1). At block 404, the feature detection module 120 determines a current SVAR metric for the image 502 currently being analyzed for scene change detection. In one embodiment, the current SVAR metric comprises the current SVAR metric for the entire image 502 ($SVAR_I$). In another embodiment, the current SVAR metric can comprise a SVAR metric for a selected region of the image 502, such as a sum of a certain number of the row projections $SVAR_{R[x]}$ or a certain number of column projections $SVAR_{C[x]}$ at a center of the image 502, or alternatively, at the sides of the image. An effective approach can include using the current SVAR metric for the active image region of the image 502 with any black border or caption regions removed or disregarded (e.g., due to the significant VAR fluctuations introduced by the caption region). As another example, the current SVAR metric can include a SVAR metric for side regions of the image 502 as the appearance or disappearance of a black border often is a reliable indicator of a scene change. In the event that detection of a fade-in or fade-out is sought, the current SVAR metric of the active image region can be evaluated for a gradual increase or decrease, thereby indicating a fade-in or fade out. As yet another example, the current SVAR metric calculated at block 404 can include the SVAR metric $SVAR_{Reg[x]}$ for the blocks at a defined center region of the image 502.

At block 406, the feature detection module 120 determines or accesses a previous SVAR metric for one or more preceding images in the video signal 500. For example, the feature detection module 120 can determine the previous SVAR metric as the corresponding SVAR metric for the immediately preceding image 504. As another example, the feature detection module 120 can determine the previous SVAR metric as an average or other representation of the corresponding SVAR metrics for a sliding window of preceding images, such as a three-image sliding window 505 that includes preceding frames 504, 506, and 508 with respect to the current image 502. The previous SVAR metric calculated for the sliding window 505 can be an unweighted average of the SVAR metrics for the images in the sliding window 505 (that is, the SVAR for each image in the sliding window 505 is weighted equally), or the previous SVAR metric can be calculated as a weighted average, whereby the SVAR metric for the image most proximate to the current image under analysis (e.g., image 504 relative to current image 502) is most heavily weighted. The previous SVAR metric typically is calculated from the same region of the preceding image(s) as the region used to calculate the current SVAR metric for image 502. For example, the current SVAR metric is the entire-image SVAR metric, then the previous SVAR metric is calculated from the entire-image SVAR metric of each of the one or more images in the sliding window 505.

A statistically-significant change in SVAR metrics between the current image and one or more of the preceding images in a video signal is a strong indicator that the current image represents a scene change. Accordingly, at block 408 the feature detection module 120 determines a difference between the current SVAR metric calculated at block 404 and the previous SVAR metric calculated at block 406. The feature detection module 120 then compares this difference with a predetermined threshold to identify whether the image 502 represents a scene change (i.e., there is a statistically-significant difference between the SVAR metric of the current image 502 and one or more preceding images). In one embodiment, the predetermined threshold is a relative threshold, such as a percentage change. To illustrate, the threshold may be set as +/−20% change from the previous SVAR metric. Thus, the current SVAR metric would exceed the threshold if the current SVAR metric were more than 20% higher or more than 20% lower than the previous SVAR metric. Alternatively, the predetermined threshold may represent an absolute change, rather than a relative change. Further, in one embodiment, the threshold may include both a relative threshold component and an absolute threshold component such that the threshold is exceeded only when both the relative threshold component and the absolute threshold component are exceeded. The threshold may be determined empirically, through simulation or modeling, and the like. Further, while the threshold may be static in some implementations, in other implementations the threshold may dynamically changed based on feedback during the transcoding process.

In the event that the difference between the current SVAR metric and the previous SVAR metric does not exceed the predetermined threshold, at block 410 the feature detection module 120 identifies the image 502 as not representing a scene change and signals the encoder 118 (FIG. 1) accordingly. Conversely, in response to determining the difference exceeds the threshold, at block 412 the feature detection module 120 identifies the image 502 as representing a scene change and signals the encoder 118 accordingly. In one embodiment, rather than basing scene change detection solely on the SVAR metric, the transcoding system 104 uses the SVAR metric in conjunction with one or more other scene change indicators. For example, the transcoding system 104 could use a combination of the SVAR metric and a volume change detection to determine whether a scene change has occurred.

At block 414, the encoder 104 encodes a portion of the video signal 500 corresponding to the image 502 based on whether the image 502 was determined to represent a scene change at blocks 410 and 412. For example, in response to the feature detection module 120 signaling via control signaling 130 that the image 502 is a scene change, the encoder 118 can perform a transcoding operation that generates a new GOP with the image 502 as the first I-frame of the new GOP, or otherwise changes the transcoding parameters (such as the rate control parameters and references of the image 502) so as to improve the quality of the transcoded representation of the image 502. In parallel, the method 400 returns to block 402 for the next image in the video signal 500, at which point the image 502 becomes a preceding image relative to the next image. The process of method 400 may continue until the video signal 500 is encoded or transcoded.

Figure 7:
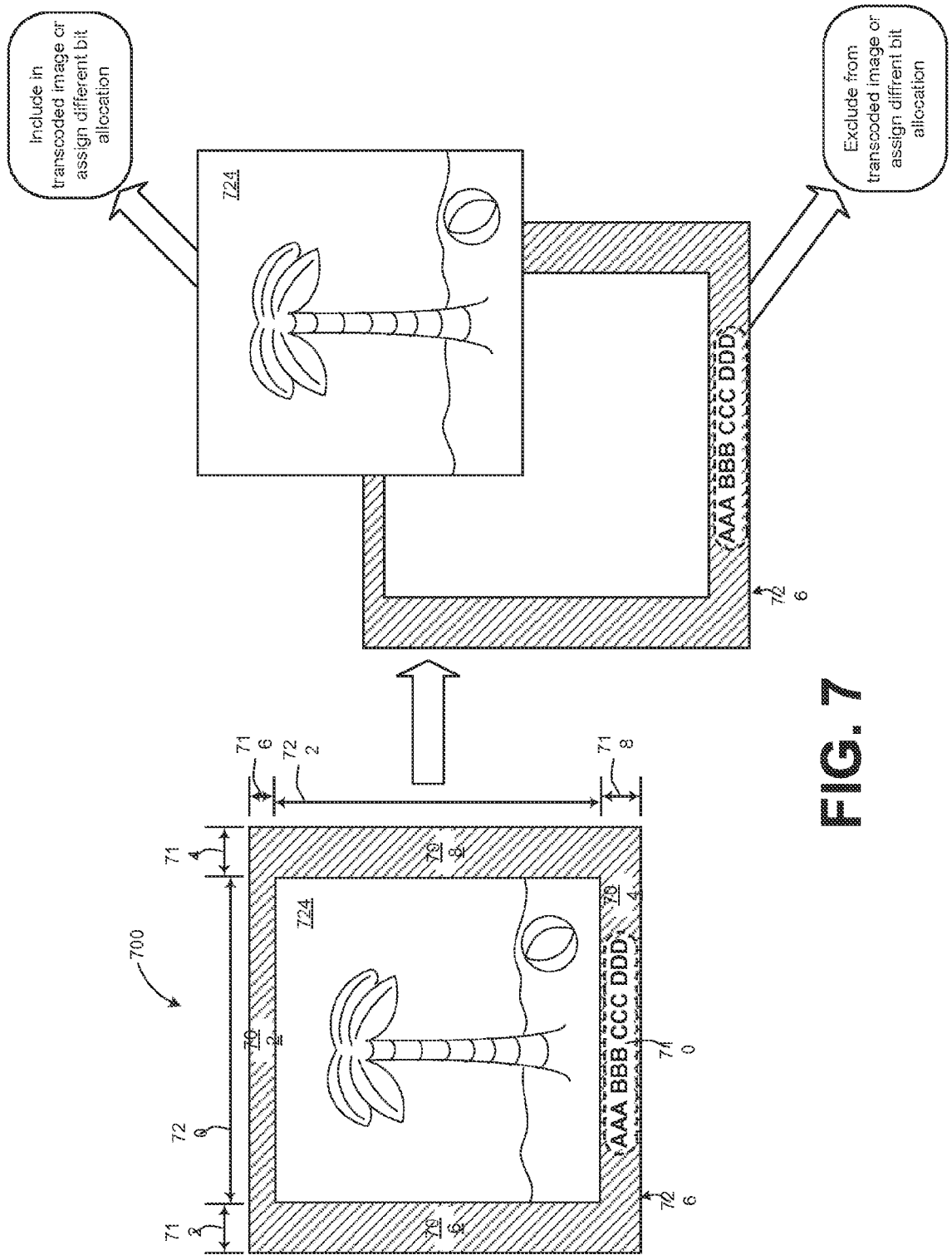
FIG. 7 is a diagram illustrating example transcoding operations for an image based on detection of a black border region or caption region in accordance with the method of FIG. 6.

FIGS. 6 and 7 illustrate a method 600 (FIG. 6) for detecting a black border region or a caption region in an image 700 (FIG. 7) based on SVAR metrics in accordance with at least one embodiment of the present disclosure. As illustrated by image 700 of FIG. 7, images of a video signal may include a black border comprising one or more black border regions, such as a top horizontal black bar 702, a bottom horizontal black bar 704, a left vertical black bar 706, and a right vertical black bar 708. These black border bars (also commonly referred to as "mattes") typically are introduced during a video encoding process or video formatting process in which the aspect ratio or resolution is changed between the original video content and the resulting video content. To illustrate, the conversion of video from a 16:9 aspect ratio common to the ATSC format to the 4:3 aspect ratio of the NTSC television often results in the introduction of the vertical black bars 702 and 704 if the entirety of the original content is to be maintained. Further, a caption region 710 often may be present in the image 700 (often in the bottom horizontal black bar 704) for the purpose of displaying closed captioning text or subtitles. The presence of these black border regions or caption regions in images conventionally leads to a sub-optimal encoding of the images as encoding resources are unnecessarily allocated to encoding the black border region or the caption region at the same fidelity as the active image region (i.e., the region of the image in which non-border or non-caption content is displayed).

Referring back to FIG. 6, the method 600 illustrates a process for detecting these black border regions or caption regions in images so as to adjust the encoding resources allocated to these regions accordingly. The method 600 initiates at block 602, whereby the feature detection module 120 receives the image 700 for analysis and determines SVAR metrics for one or more variance row projections and/or one or more variance column projections in one or more border regions of the image 700. To illustrate, if it is assumed that a black border, if present at all, would reside within the columns of pixel blocks within vertical border regions 712 and 714 and within the rows of pixel blocks within horizontal border regions 716 and 718, the feature detection module 120 can determine the variance column projections $SVAR_{C[X]}$ for those columns X of pixel blocks that fall within vertical border regions 712 and 714 and the variance row projections $SVAR_{R[Y]}$ for those rows Y of pixel blocks that fall within horizontal border regions 716 and 718. Also under this assumption, the feature detection module 120 would bypass SVAR metric computation for the pixel blocks that fall within both vertical region 720 and horizontal region 722 under the expectation these pixel blocks would constitute the active image region 724 of the image 700.

The feature detection module 120 can detect a black border region 726 from these SVAR projections in a number of ways. In one embodiment, the feature detection module 120 can detect each black bar, or matte, of the black border individually. For example, the feature detection module 120 can sum or average the variance row projections in horizontal border region 716 to determine a region SVAR metric for detecting the presence of the top horizontal black bar 702. Likewise, the feature detection module 120 can sum or average the variance row projections in horizontal border region 718 to determine a region SVAR metric for detecting the presence of the bottom horizontal black bar 704. Similarly, the feature detection module 120 can sum or average the variance column projections in vertical border region 712 to determine a region SVAR metric for detecting the presence of the left vertical black bar 706 and sum or average the variance column projections in vertical border region 714 to determine a region SVAR metric for detecting the presence of the right vertical black bar 708.

Alternatively, the feature detection module 120 can detect the black bars in pairs (top and bottom black bars 702 and 704, or left and right black bars 706 and 708), such as by summing or averaging the variance row projections in both border regions 716 and 718 or by summing or averaging the variance column projections in both border regions 712 and 714. In another embodiment, the presence of the black border region 726 as a whole can be detected by, for example, summing or averaging the variance row projections from horizontal border regions 716 and 718 and the variance column projections from vertical border regions 712 and 714 together.

At block 604, the feature detection module 120 uses the one or more SVAR metrics determined at block 602 to detect whether the black border region 726, or one or more black bars thereof, is present in the image 700. Generally, the SVAR metrics for those regions of an image in which a black border or border bar is present have a relatively low variance as there would be little variance between the pixels of the pixel block. Accordingly, the feature detection module 120 can uses a predetermined threshold corresponding to this expected low variance as a trigger for detecting the black border region 726. In the event that the SVAR metric from block 602 exceeds the threshold, the feature detection module 120 identifies the image 700 as containing the back border 726 (or corresponding bar component) and signals the encoder 118 (FIG. 1) accordingly. To illustrate, it may be determined from empirical analysis or modeling that the average of the variance row projections in region 716 of an image having a black border is less than K. Thus, the threshold for detecting the presence of the top black bar 702 may be set to K such that when the average of the variance row projections for the pixel blocks in region 716 of the image 700 falls below K, the feature detection module 120 identifies image 700 has having the top black bar 702 at horizontal region 716. While the threshold may be static in some implementations, in other implementations the threshold may dynamically changed based on feedback during the transcoding process.

In certain implementations, the extent of the border bars may not be reliably predicted. For example, the transcoding system 104 may not be aware of any aspect ratio changes made in the received video signal 108. Accordingly, rather than rely on predefined regions 712, 716, 716, and 718. The feature detection module 120 can instead detect the transition from a black bar to the active image region 724 (that is, the edge of the black bar) by detecting a statistically-significant change between variance row projections of adjacent rows of pixel blocks or between variance column projections of adjacent columns of pixel blocks. For example, the feature detection module 120 may identify as the edge of the left vertical black bar 706 the line dividing a column of pixel blocks with a variance column projection below a predetermined threshold and a column of pixel blocks with a variance column projection above a predetermined threshold. Alternatively, feature detection module 120 may identify as the edge of the left vertical black bar 706 the first column of pixels having a variance column projection that is at least, for example, 20% greater than the variance column projection of the column of pixels lateral and adjacent to the first column.

The transcoding system 104 may perform any of a variety of transcoding operations in response to detecting the black border region 726 (or components thereof) in the image 700. To illustrate, at block 606 the transcoding system 104 could crop the image 700 for the resulting transcoded video signal such that the image content in the black border region 726 is omitted in the corresponding transcoded image, and thus only the image content in the active image region 724 is included in the corresponding transcoded image. Alternatively, at block 608 the detected black border region 726 (or components thereof) may continue to be represented in the corresponding transcoded image, but at a lower fidelity. In this instance, the encoder 118 may allocate a higher bit rate or bit budget to the active image portion 724 and allocate a lower bit rate or bit budget to the detected black border region 726, thereby allowing the active image region 724 to have an improved fidelity for a given bit allocation for the overall image.

The caption region 710 may be detected and handled by the transcoding system 104 in a similar manner. For example, at block 604 the feature detection module 120 may determine a SVAR metric by, for example, summing or averaging the variance row projections for the caption region 710. However, unlike a black frame region, a caption region 710 is expected to have a relatively high SVAR due to the sharp contrast (and thus variance) between the typically white pixels representing the characters in the caption region 710 and the typically black pixels representing the background in the caption region 710. Accordingly, at block 606 the feature detection module 120 would detect the presence of the caption region 710 by determining that the SVAR metric for the expected caption region 710 falls above a predetermined threshold, which may be determined empirically, through modeling, and may be static or may be updated dynamically based on feedback during the transcoding process. In the event that the caption region 710 is identified, the caption region 710 may be cropped from the resulting transcoded image at block 606 or may be allocated a higher bit budget for very low bit-rate transcoding to improve subjective quality at detailed above.

Figure 8:
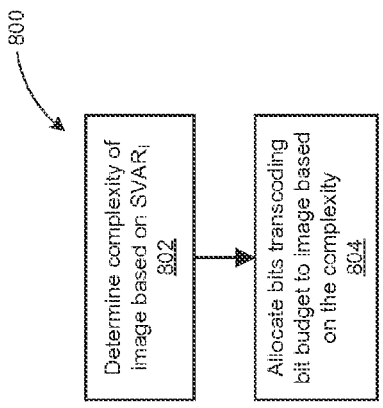
FIG. 8 is a flow diagram illustrating a method for determining a complexity of an image based on a sum of variances analysis and adjusting a transcoding of the image based on the complexity in accordance with at least one embodiment of the present disclosure.

FIG. 8 illustrates an example method 800 for using an SVAR metric for allocation of bits to an image for bit rate control in accordance with at least one embodiment of the present disclosure. The method 800 initiates at block 802, whereby the feature detection module 120 receives an image from the video signal 108 (FIG. 1) for analysis and determines the SVAR metric for the entire image ($SVAR_I$). This SVAR metric represents the complexity of the image in that the higher the $SVAR_I$, the more complex the image. At block 804 the encoder 118 modifies the implemented rate control based on the indicated complexity of the image. To illustrate, for a constant quality system, an image having a higher $SVAR_I$, and thus a higher complexity, may be allocated a higher bit budget or lower quantization parameter than an image having a lower $SVAR_I$, and thus a lower complexity. For a constant bit rate system, an image having a higher $SVAR_I$, and thus a higher complexity may call for a higher quantization parameter than an image having a lower $SVAR_I$, and thus a lower complexity under the same bit budget limitation.

Although FIGS. 3-8 illustrate example transcoding operations that may be implemented or modified based on determined SVAR metrics, any of a variety of transcoding operations may be implemented or modified in a similar manner without departing from the scope of the present disclosure.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A system comprising:
a feature detection module to determine a first sum of variances metric representing a sum of variances of pixel blocks of a region of an image of a video signal, to determine a second sum of variances metric representing a sum of variances of pixel blocks of a corresponding region of at least the preceding image, and to determine the image represents a scene change based on a difference between the first sum of variances metric and an average sum of variances metric for a plurality of preceding images, the second sum of variances metric being represented in the average sum of variances metric; and
a transcoder to transcode the video signal to generate a transcoded video signal, the transcoder to perform at least one transcoding operation in response to the feature detection module determining the image represents a scene change.

2. The system of claim 1, wherein the at least one transcoding operation comprises at least one of: generating a new group of pictures with a transcoded representation of the image as the first Intra-coded frame of the new group of pictures; and adjusting a rate control parameter for transcoding the image.

3. A method for transcoding a video signal, the method comprising:
determining, at a feature detection module of a transcoding system, a first sum of variances metric representing a sum of variances of pixel blocks of a region of an image of the video signal;
determining, at the feature detection module, a second sum of variances metric representing a sum of variances of pixel blocks of a corresponding region of at least the preceding image;
determining, at the feature detection module, the image represents a scene change based on a difference between the first sum of variances metric and an average sum of variances metric for a plurality of preceding images, the second sum of variances metric being represented in the average sum of variances metric; and
performing, at a transcoder of the transcoding system, at least one transcoding operation in response to determining the image represents a scene change to generate a transcoded video signal.

4. The method of claim 3, wherein performing the at least one transcoding operation comprises at least one of: generating a new group of pictures with a transcoded representation of the image as the first Intra-coded frame of the new group of pictures; and adjusting a rate control parameter for transcoding the image.

* * * * *